United States Patent [19]
Burger et al.

[11] Patent Number: 5,394,487
[45] Date of Patent: Feb. 28, 1995

[54] FORMS RECOGNITION MANAGEMENT SYSTEM AND METHOD

[75] Inventors: Mark E. Burger, Germantown; Hsiao H. Sun, Potomac, both of Md.

[73] Assignee: International Business Machines Corporation, Armonk, N.Y.

[21] Appl. No.: 141,734

[22] Filed: Oct. 27, 1993

[51] Int. Cl.⁶ .............................................. G06K 9/20
[52] U.S. Cl. ......................................... 382/61; 382/18
[58] Field of Search ....................... 382/61, 30, 36, 37, 382/18

[56] References Cited

U.S. PATENT DOCUMENTS

| | | | |
|---|---|---|---|
| 4,503,556 | 3/1985 | Scherl et al. | 382/9 |
| 4,533,959 | 8/1985 | Sakurai | 358/280 |
| 4,741,045 | 4/1988 | Denning | 382/9 |
| 4,748,678 | 5/1988 | Takeda et al. | 382/56 |
| 4,933,984 | 6/1990 | Nakano et al. | 382/61 |
| 4,949,392 | 8/1990 | Barski et al. | 382/61 |

OTHER PUBLICATIONS

IBM Technical Disclosure Bulletin, H. Aghili, et al., "Converting Paper Document to Electronic Images With Automatic Document" . . . , vol. 34, Mar. 1992; pp. 435-439.

*Primary Examiner*—Joseph Mancuso
*Assistant Examiner*—G. Del Rosso
*Attorney, Agent, or Firm*—David A. Mims, Jr.; John E. Hoel

[57] ABSTRACT

Document form templates are grouped into groups of related form templates. The number of times a particular template is used by the system is counted for each group during a forms processing interval. Then when processing submitted forms, the method scans in a plurality of them in an aggregated submission. Forms recognition processing starts for a first form. The method begins searching for a form template to match the first form, starting with the most frequent group. If recognition of the first form is successful with the most frequent primary form template, then the method searches the group for the remaining submitted forms. If recognition of the first form is not successful with the most frequent group, then the method tries to match the first form with a template in the second most frequently processed primary group. In this manner, forms recognition of preprinted forms is managed, with the order of searching the template changed, in response to the frequency with which particular form types are processed.

5 Claims, 10 Drawing Sheets

| FIG. 3A |
|---------|
| FIG. 3B |
| FIG. 3C |

FORMS RECOGNITION MANAGEMENT SYSTEM AND METHOD

BACKGROUND OF THE INVENTION

1. Technical Field

The invention disclosed broadly relates to data processing and more particularly relates to recognition of document forms.

2. Related Patents and Patent Applications

This patent application ms related to the copending U.S. patent application, Ser. No. 07/870,129, filed Apr. 15, 1992, entitled "Data Processing System and Method for Sequentially Repairing Character Recognition Errors for Scanned Images of Document Forms," by T. S. Betts, et al., U.S. Pat. No. 5,251,273, the application being assigned to the IBM Corporation and incorporated herein by reference.

This patent application is also related to the copending U.S. patent application, Ser. No. 07/870,507, filed Apr. 17, 1992, entitled "Data Processing System and Method for Selecting Customized Character Recognition Processes and Coded Data Repair Processes for Scanned Images of Document Forms," by T. S. Betts, et al., the application being assigned to the IBM Corporation and incorporated herein by reference.

This patent application is also related to U.S. Pat. No. 5,140,650, Ser. No. 07/305,828, entitled "A Computer Implemented Method for Automatic Extraction of Data From Printed Forms," by R. G. Casey, et al., the patent being assigned to the IBM Corporation and incorporated herein by reference.

This patent application is also related to the copending U.S. patent application, Ser. No. 08/051,972, filed Apr. 26, 1993, entitled "System and Method for Enhanced Character recognition Accuracy by Adaptive Probability Weighting," by M. P. T. Bradley, the application being assigned to the IBM Corporation and incorporated herein by reference.

This patent application is also related to the copending U.S. patent application by D. W. Billings, et al. entitled "Method and System for Fast Forms Recognition of Document Form Images," Ser. No. 08/143,518, filed Oct. 29, 1993, assigned to the IBM Corporation.

This patent application is also related to U.S. patent application by V. M. Carras, et al. entitled "Enhanced Methods for Forms Definition, Recognition and Verification" Ser. No. 08/136,643, filed Oct. 14, 1993, assigned to the IBM Corporation and incorporated herein by reference.

BACKGROUND ART

Business and government agencies rely on forms to gather data for their operations. Preprinted forms enable a business to efficiently gather data from submitters, for entry into data processing systems. The above cited references describe several examples of systems and methods to scan a digital image of preprinted forms and perform character recognition on the images of those forms, to gather the needed data.

Dozens and even hundreds of different form types may be in use by a business or government agency during a given year. The U.S. Internal Revenue Service, for example, must issue new editions of its tax return forms each year, to comply with annual changes in the federal tax code. Each year, they must issue several hundred new versions of old tax return forms and completely new tax return forms. Many of those forms are preprinted on the back, as well as the front side.

The automated processing of submitted, preprinted forms begins with recognizing the form identification of the digital image of the form. This requires a definition of the distinctive appearance features of the form, referred to here as a template. A forms recognition template may be a digital image of a master copy of the form which has not been filled out. Or, a template may be the coordinates and value of a form number or bar code. Or, a template may be a matrix of run length code values corresponding to a portion or all of a master form. These and many other examples of forms recognition templates are given in the above cited references.

A significant problem with the prior art of forms recognition is that the entire archive of form templates must be searched to identify each form scanned into the system. This imposes a significant limitation on the performance of the forms recognition stage of forms processing.

OBJECTS OF THE INVENTION

It is therefore an object of the invention to manage forms recognition of preprinted forms in an improved manner.

It is another object of the invention to manage forms recognition of preprinted forms, to reduce the time required to find the correct forms recognition template in a template archive.

It is another object of the invention to adaptively manage forms recognition of preprinted forms, to change the order of searching the template archive, in response to the frequency with which particular form types are processed.

SUMMARY OF THE INVENTION

These and other objects, features and advantages are accomplished by the forms recognition management system and method disclosed herein. The method of the invention is particularly adapted to businesses and agencies that receive a plurality of mutually related forms with each submission. This is referred to as an aggregated submission. Income tax return forms are a prime example, where the Federal Individual Income Tax Return 1040 Form is a primary form for a particular tax year, and is usually accompanied by related forms, such as Schedule A and Schedule B, that also pertain to the same tax year. Another example is the Quarterly Federal Excise Tax Return Form 720, that is usually accompanied by Form 720 Schedule A. Other agencies and businesses receive aggregated submissions of forms, such as insurance companies, loan departments of banks, and many others.

The method of the invention begins by grouping all form templates by their related primary form template. For example, the front face of the 1040 Form is a primary form in a Federal income tax submission. It characterizes the transaction type and the tax year for the transaction. Then the number of times templates from a group are used is counted for each group during a forms processing interval. The interval may be over the previous month, week, day or hour of processing. The order of search of template groups is then arranged by from most frequently processed to least frequently processed group. Then when processing submitted, preprinted forms, the method scans in a plurality of submitted forms in an aggregated submission. Forms recognition processing starts for a first form in the submission. In accordance with the invention, the method begins searching for a form template to match the first form, starting with the most frequent group. If recognition of the first form is successful with the most frequent group, then the method searches the group to match the second form. These two steps may be performed in the same forms recognition processor. Alternately, the search for the first form may be done in an intelligent scanner having its own forms recognition function. When the intelligent scanner finds the form template that matches the first form, it outputs the identity of the group to a second forms recognition processor, that accesses the group of related form templates to search for the second form.

A group of related templates is generally composed of relatively large files, requiring significant storage capacity. The archive of many groups of related form templates is generally stored on a storage server. Only one or a few frequently processed groups of related forms templates are stored in the forms recognition processor. For maximum speed of forms recognition, templates are stored in the RAM memory of the forms recognition processor. Because of memory constraints, only a few groups are stored in the RAM at any one time. Thus is it vital to the performance, that the correct group is available in the RAM memory of the processor for most of the forms processed during a particular processing session. By reducing the size of a group to the most probable templates, the overall performance is improved.

After the successful identification of the first form, the method starts the forms recognition process for the next submitted form in the aggregated submission. The method searches for a form template to match the next submitted form, starting with form templates in the first group. If recognition of the next submitted form is successful with form templates in the first group, then the method continues the forms recognition process for the remaining plurality of submitted forms in the aggregated submission. If recognition of the next submitted form is not successful in the first group, then the method searches for a form template in other groups in the archive.

If recognition of the first form is not successful with the most frequent group, then the method searches for a form template to match the first form, using the second most frequently processed group. If recognition of the first form is successful with the second most frequent group, then the method searches the second group to match the search form in the submission.

The resulting invention manages forms recognition of preprinted forms in an improved manner, to reduce the time required to find the correct forms recognition template in a template archive.

The invention adaptively manages forms recognition of preprinted forms, to change the order of searching the template archive, in response to the frequency with which particular form types are processed.

DESCRIPTION OF THE FIGURES

These and other objects, features and advantages will be more fully appreciated with reference to the accompanying figures.

DISCUSSION OF THE PREFERRED EMBODIMENT

Figure 1:
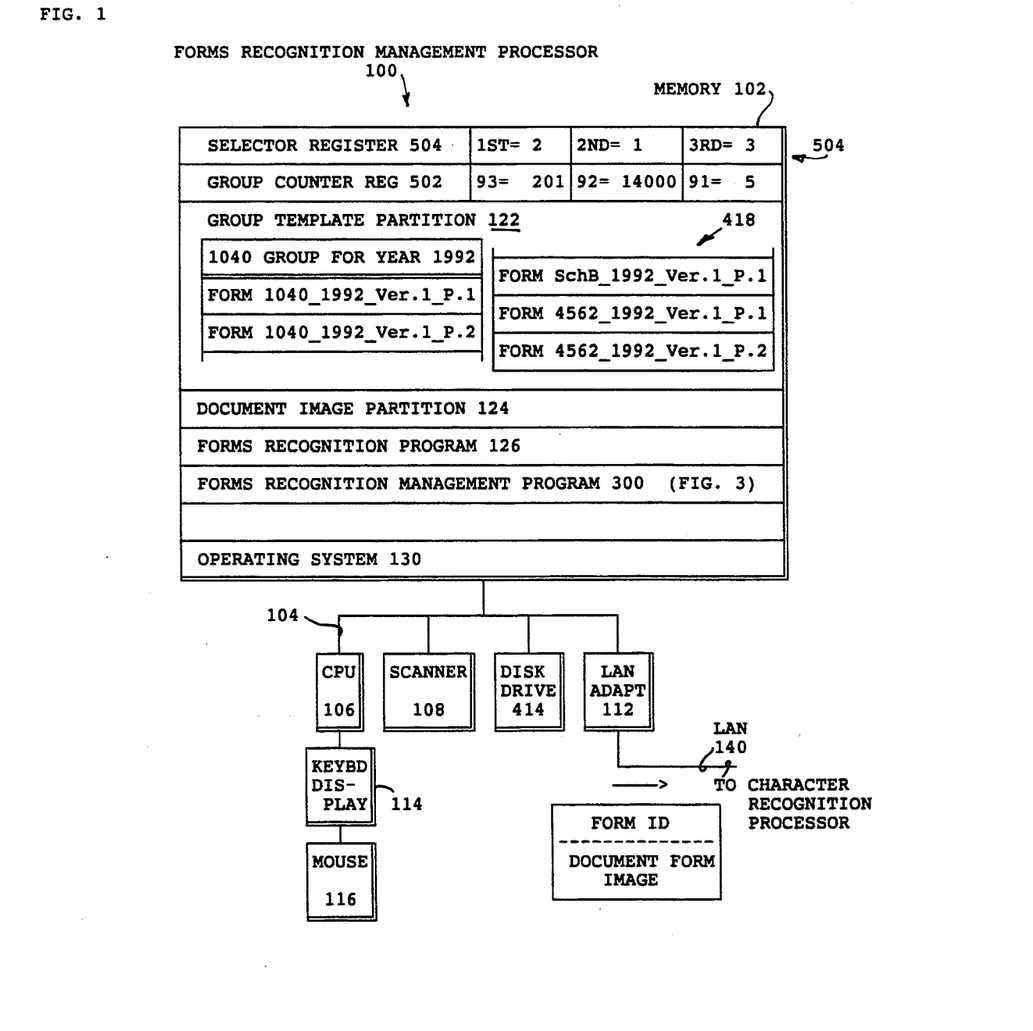
FIG. 1 is a functional block diagram of the forms recognition management processor, in accordance with the invention.

The forms recognition management system and method can be carried out with the forms recognition management processor 100 shown in FIG. 1. Processor 100 includes a memory 102 connected by the bus 104 to the CPU 106, a scanner 108, the disk drive 414 and the LAN adapter 112. The bus 104 is also connected to the keyboard and display 114 and the mouse pointing device 116. The LAN adapter 112 is connected over the local area network 140 to a character recognition processor.

Figure 3:
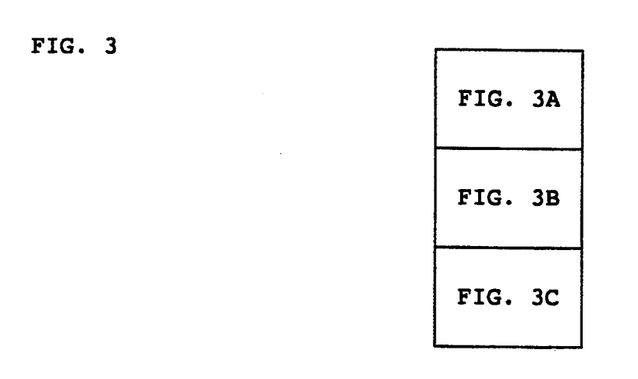
FIG. 3, composed of FIGS. 3A, 3B and 3C, is a flow diagram of a sequence of operational steps for the forms recognition management program to organize and search a forms template library.

The memory 102 in FIG. 1 includes the selector register 504, that includes a first order selection, second order selection and third order selection in partition 504. The group counter register 502, includes the groups 93, 92 and 91. A group template partition 122, includes a template group 418. A document image partition 124, will store the digitized image of a document scanned in by the scanner 108. A forms recognition program 126 is stored in the memory 102. The forms recognition management program 300, whose flow diagram is shown in FIG. 3, is stored in the memory 102. Also included in the memory 102 is an operating system 130. The programs stored in the memory 102 are each sequences of executable instructions, which, when executed in the CPU 106, perform the intended operations.

Figure 4:
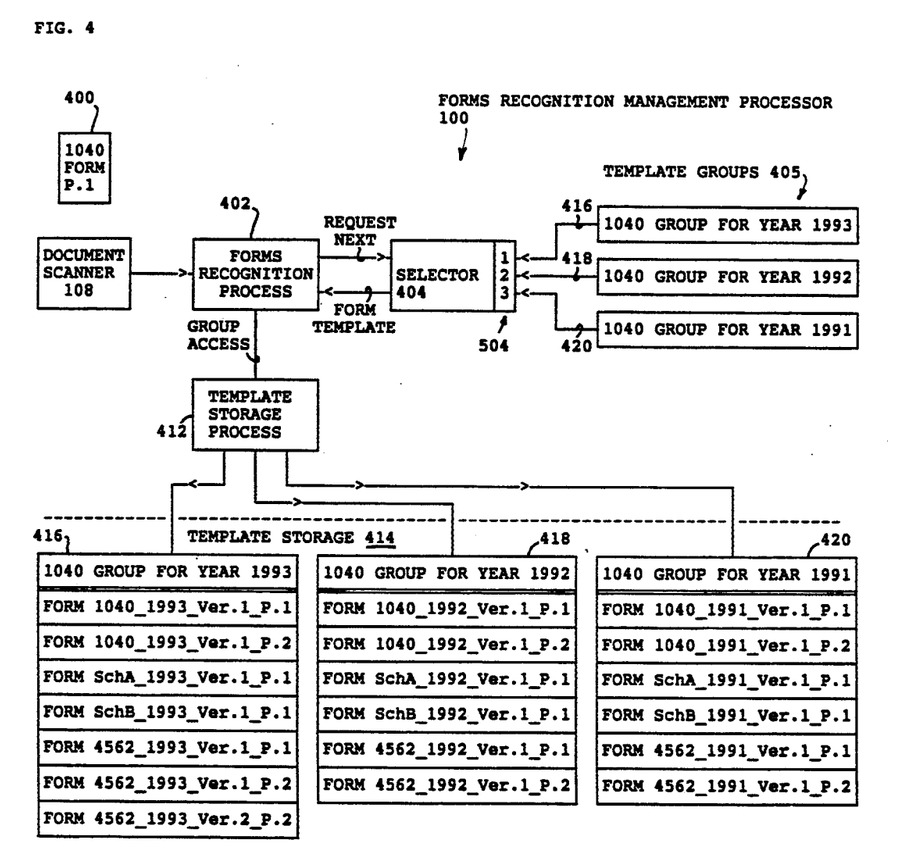
FIG. 4 shows a process flow diagram of the forms recognition management processor.

Reference can be made to FIG. 4 which shows a process flow diagram of the forms recognition management process as it is carried out in the processor 100. In FIG. 4, it is seen that a primary form, for example page 1 of a Federal Income Tax 1040 form, numbered 400, is scanned in by the document scanner 108 into the forms recognition process 402. The forms recognition process 402 will output a request for a next template group to be input to it. In the example shown in FIG. 4, there are three template groups 405, the form 1040 group for the year 1993, numbered 416; the form 1040 group for the year 1992, numbered 418; and the form 1040 group for the year 1991, numbered 420. The selector 404 will select either template group 416, 418 or 420, depending upon the order specified in the selector register 504. As shown in FIG. 4, the selector register 504 has ordered group 416 as the first group, 418 as the second group, and 420 as the third group to be consecutively input to the forms recognition process 402, when it requests the next group.

When the forms recognition process 402 successfully identifies one of the template groups 416, 418 or 420, as having a best match template for the input form image 400, it will search the group to find matches for the remaining forms in the submission. In the example shown in FIG. 4, group 416 is the 1040 group for year 1993, and consists of seven related forms, the form 1040, year 1993, version 1, page 1 and page 2; the form Schedule A, year 1993, version 1, page 1; the form Schedule B, year 1993, version 1, page 1; the form 4562 for year 1993, version 1, page 1; the form 4562 for year 1993, version 1, page 2; and the form 4562 for year 1993, version 2, page 2. A similar collection of forms is grouped in the group 418, for the 1040 group for year 1992. Note that the group 418 lacks version 2 for the form 4562, page 2. Similarly, the third group in the template storage 414 is group 420, which is the 1040 group for the year 1991. It also includes forms similar to those for the year 1992, but each having the distinctive appearance of the 1991 tax year forms.

In accordance with the invention, when processing submitted preprinted forms, the method scans in a plurality of submitted forms in an aggregated submission. This could be for example, a 1993 Federal 1040 form, page 1, followed by the images for 1040 page 2, Schedule A, Schedule B, and the front and back sides of a form 4562. Forms recognition processing starts for the first form in the submission, which is placed first in the document scanner 108. In accordance with the invention, the method begins by searching for a template group to match the first form, starting with the most frequent group. In FIG. 4, the selector 404 selects as a first group, the first group designated in the register 504, which is group 416, the form 1040 of year 1993. Initially, the most frequent group 416 is stored in the RAM memory of processor 100. If recognition of the first form is successful with a template in the most frequent template group 416, then the method searches the same group for the rest of the submitted forms. In the example shown in FIG. 4, the forms recognition process 402 will identify the primary form image 400 input from the document scanner 108, as matching the primary template in group 416. It will then to search the group 416 for the rest of the group 1040 forms for the year 1993. These two steps may be performed in the same forms recognition processor 100 shown in FIG. 1.

Figure 2:
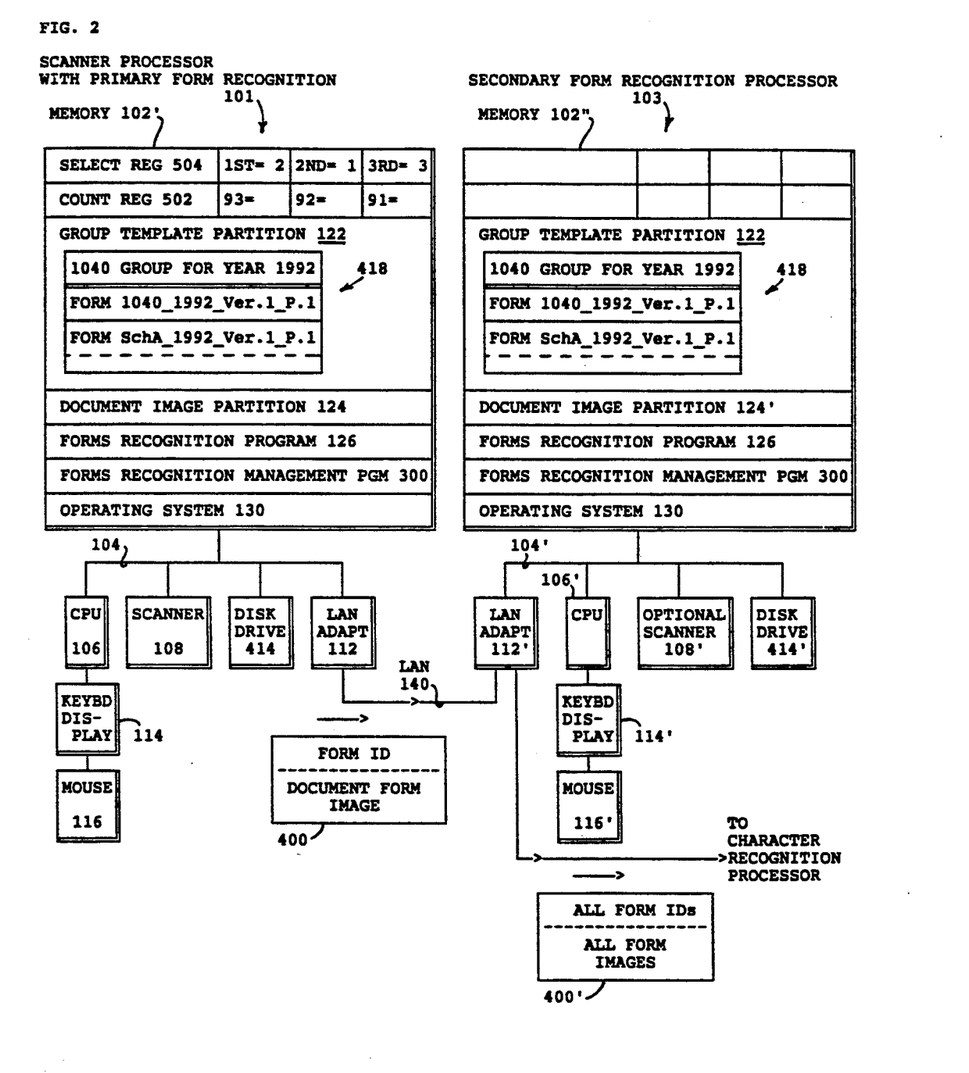
FIG. 2 is an alternate embodiment functional block diagram of the forms recognition management system.

Alternately, the search for the form may be done in an intelligent scanner having its own forms recognition function, such as the scanner processor with primary form recognition 101, shown in FIG. 2. When the intelligent scanner 101 finds the form template that matches the form, it outputs the identity of the form over the LAN 140 to a second form recognition processor 103 shown in FIG. 2. The secondary forms recognition processor 103 will then access the group of related form templates from the template storage 414 or 414'. The secondary form recognition 103 will then perform forms recognition on all of the remaining forms in the group, and will output all form IDs and form images 400' to the character recognition processor.

Figure 5A:
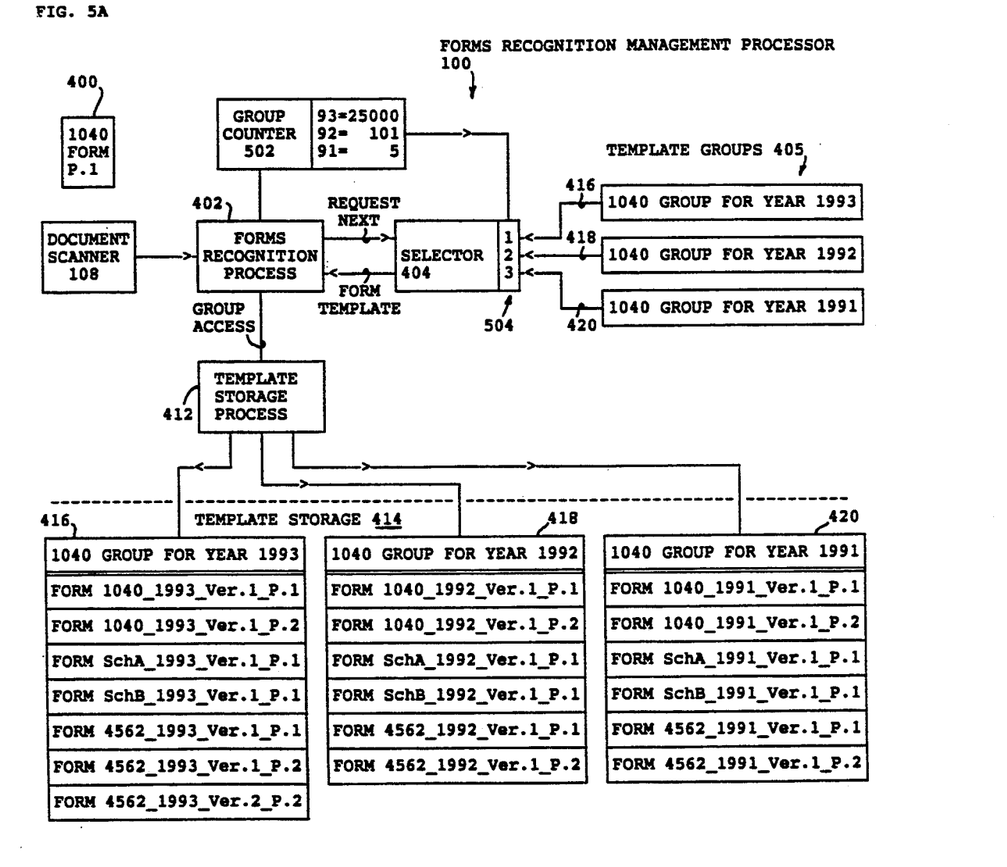
FIGS. 5A, 5B and 5C show a process diagram for the forms recognition management processor, showing a particular example for the adaptive management feature.

Turning to FIG. 5A, an adaptive management feature is another aspect of the invention. In FIG. 5A, a group counter 502 is connected to a forms recognition process 402, to count the number of times templates from a group are used, for each group during a forms processing interval. The interval may be over the previous month, week, day or hour of processing. For example, FIG. 5A shows the group counter 502 having counted 25,000, uses of year 1993 group 416, 101 groups 418, and only five groups 410. The group counter 502 will apply the frequency of occurrence of each respective group processed over the previous interval, to the selector register 504, establishing the order of examination for the groups 405. As is shown in FIG. 5A, since the 1993 primary form is the most frequently processed, template group 416 is selected first by the forms recognition process each time a new first form in a submission aggregate, is scanned by the document scanner 108. If the first template group 416 fails in having a template matched to the image of the input form, the selector 404 then selects the second template group 418. If that one fails, then the selector 404 selects the third template 420. This is established by the selector register 504, as controlled by the group counter 502.

Figure 5B:
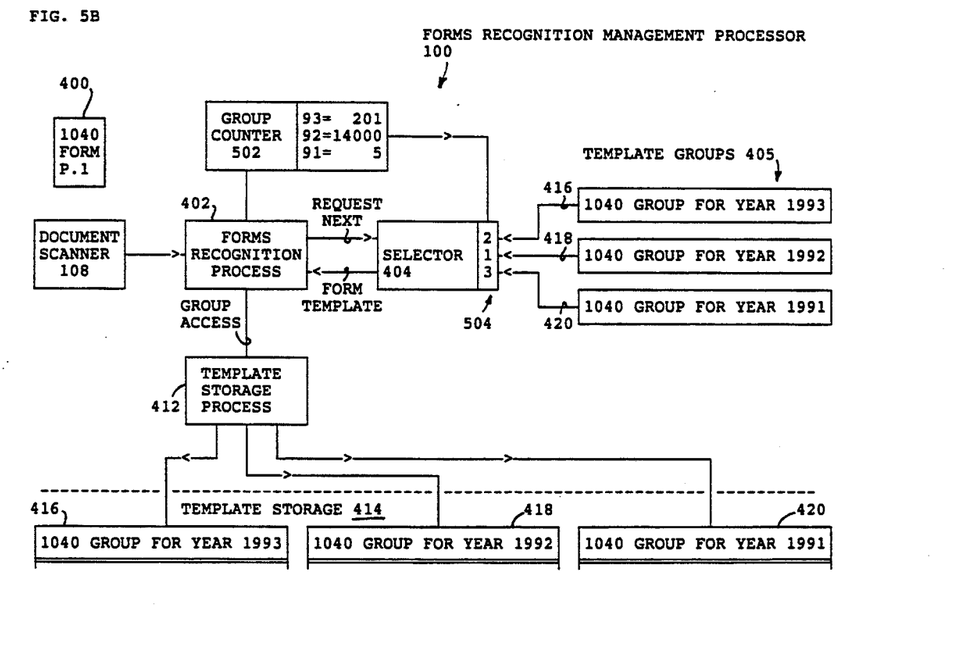

Referring o FIG. 5B, the example of FIG. 5A is changed by showing in the group counter 502, that only 201 times the 1993 group has been processed, whereas 14,000 times of the 1992 group has been processed in the previous interval. The 1991 count now remains at five. This information is applied to the selector register 504 in the selector 404, giving a different order for accessing the template groups 405. In FIG. 5B, each time a new first form 400 s scanned by the document scanner 108, the selector 404 will first select group 418 for searching and matching in the forms recognition process 402. Next, the group 416 will be searched and then thirdly the group 420 will be searched.

Figure 5C:
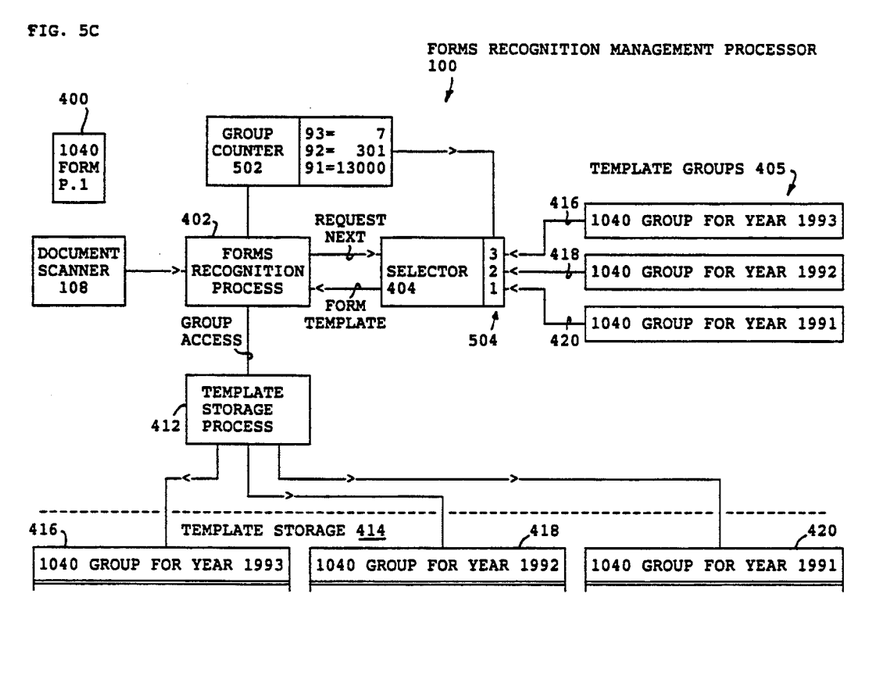

FIG. 5C carries the example into a slightly different variation, where the group counter 502 has counted 13,000 uses of the 1991 group, whereas the 1992 group has only 301 processed, and the 1993 group has only seven processed. This information is applied to the elector register 504, resulting in the order of selection of the template groups 405, as being first the group 420, the secondly the form 418, and then thirdly the form 416.

A group of related templates such as the group 416 in FIG. 5A, is generally composed of relatively large files, requiring significant storage capacity. The archive of many groups of related form templates is generally stored on a storage server, such as the disk drive 414 in FIG. 1. Only one or a few frequently processed groups of related forms templates are stored in the forms recognition processor memory 102. For maximum of speed of forms recognition, templates are stored in the RAM memory 102 of the forms recognition processor 100. Because of memory constraints, only one group is stored in the RAM at any one time. Thus it is vital to the performance of forms recognition, that the correct group 416, or 418, or 420, is available in the RAM memory 102 of the processor 100, for most of the forms processed during a particular processing session.

After the successful identification of the group 405, the method starts the forms recognition process for the next submitted form in the aggregated submission. The method searches for a form template to match the next submitted form, starting with the relate form templates in the group 416, for example. If the next submitted form is successful with the form templates n the group 416, then the method continues the forms recognition process for the remaining plurality of submitted forms in the aggregated submission scanned in by the document scanner 108. If recognition of the next submitted form is not successful in the group 416, for example, then the method searches for a form template in other groups 418 or 420, in the template storage 414.

If recognition of the first form is not successful with the most frequent template group, for example template group 416 in FIG. 5A, then the method searches for a form template to match the first form, by accessing from storage 414, the second most frequently processed template group, template group 418 in FIG. 5A. If recognition of the first form is successfully matched with the second most frequent template group 418, then the method searches the second group for the rest of the submitted forms. The resulting invention manages forms recognition of preprinted forms in an improved manner, to reduce the time required to find the correct forms is recognition template in a template archive. The invention adaptively manages forms recognition of preprinted forms, to change the order of searching the template archive, in response to the frequency with which particular form types are processed. Returning to FIG. 1, the forms recognition management processor 100, will output the form ID and the document form image over the local area network 140, to a character recognition processor, such as those described in the above reference patent applications.

In FIG. 2, the alternate embodiment of the invention shows the scanner processor 101, including the memory 102', which is connected by means of the bus 104 to the CPU 106, the scanner 108, the disk drive 414, and the LAN adapter 112, which is connected by means of the LAN 140 to the LAN adapter 112' of the secondary forms recognition processor 103. Bus 104 also is connected to the display and keyboard 114 and the mouse pointing device 116. The memory 102' includes the selection register 504, and the counter register 502. The document image partition 124 and the forms recognition program 126 are included in the memory 102'. The forms recognition management program 300 and the operating system 130 are also included. The programs stored in the memory 102', are sequences of executable instructions, which when executed by the CPU 106, carry out the intended functions of the programs.

Also included in the alternate embodiment of FIG. 2, is the secondary form recognition processor 103. The processor 103 includes the memory 102'', which is connected by means of the bus 104' to the LAN adapter 112', the CPU 106', the optional scanner 108' and the disk drive 414' which can store the same group template storage information as the disk drive 414'. Also connected to the bus 104' is the keyboard and display 114' and the mouse pointing device 116'. Stored in the memory 102'' is the group template partition 122, which is shown storing the group 418 for example. The document image partition 124' will store the form images 400 received over the LAN 140 from the scanner 108 connected to the scanner processor 101. The forms recognition program 126 and the forms recognition management program 300 are stored in the memory 102''. The operating system 130 is also stored therein. After the secondary forms recognition processor 103 has processed the secondary forms in the group 418, all form IDs and all form images 400' are output to the character recognition processor, such as those described in the above referenced patent applications.

Figure 3A:
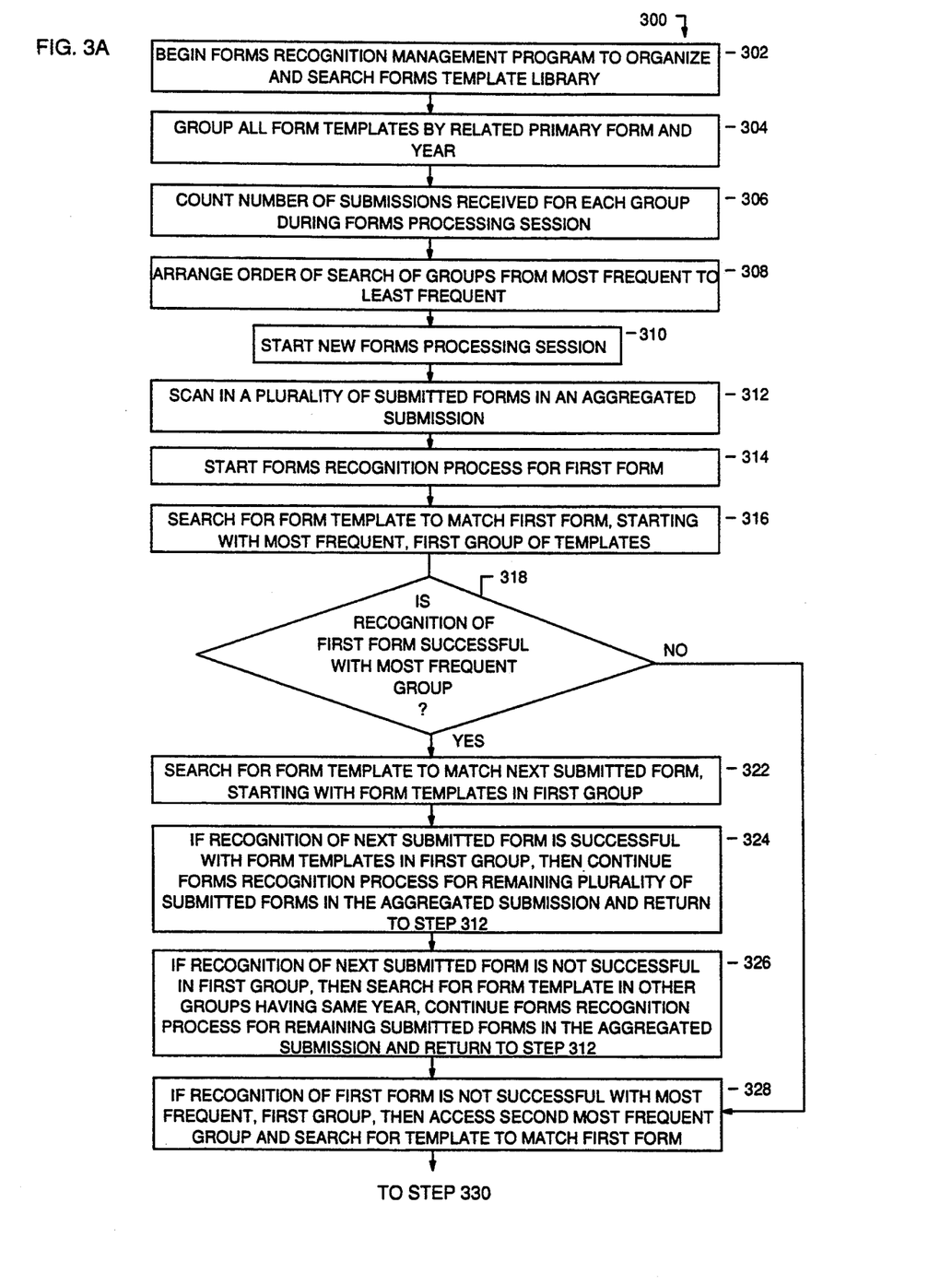
Figure 3B:
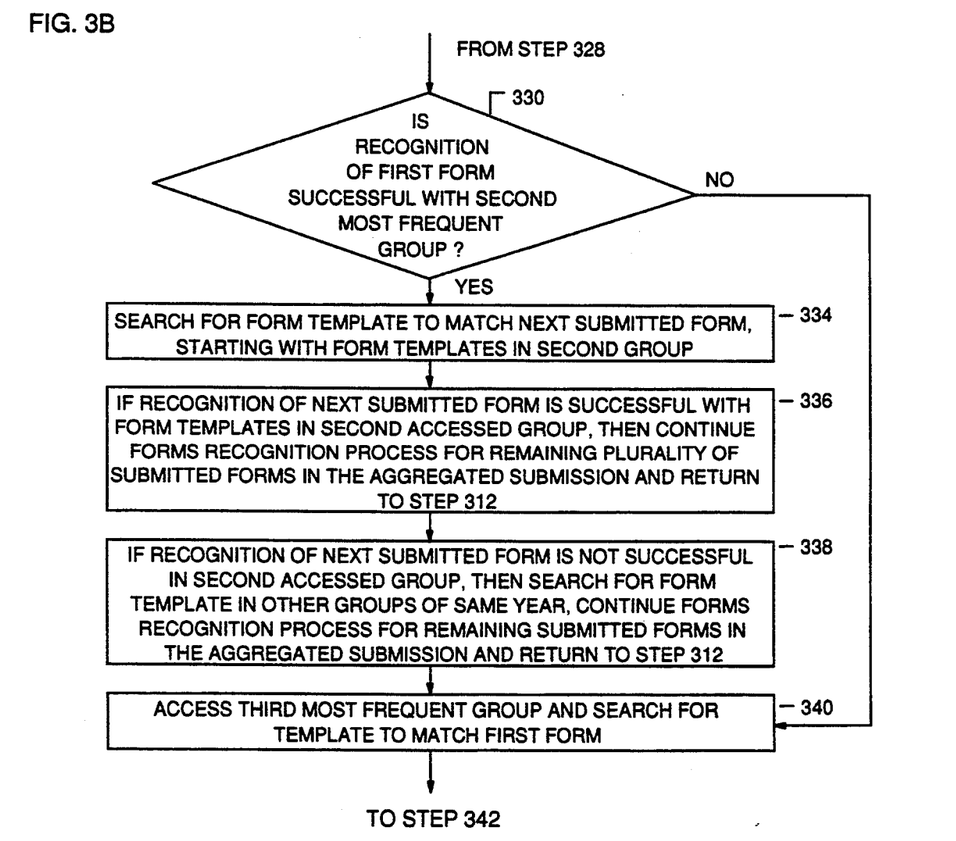
Figure 3C:
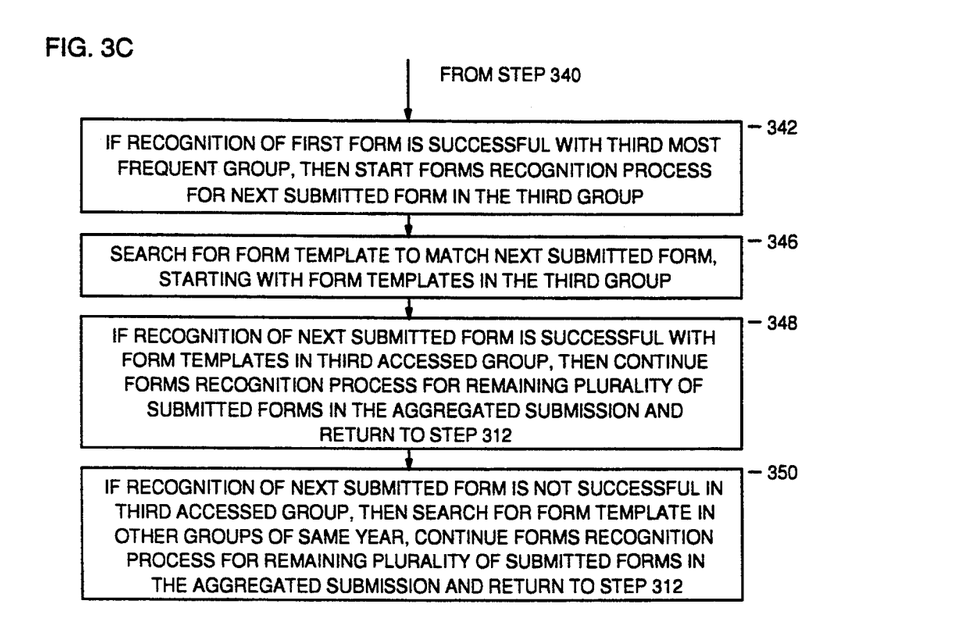

FIG. 3 is composed of FIGS. 3A, 3B and 3C, and are a sequence of executable instructions for carrying out the method of the invention. The forms recognition management program 300, begins with step 302 to organize and search the forms template library. Step 304 groups all form templates by related primary form template and year. Other common descriptive features can be used to group templates besides the year, such as the version, the page number particular business applications, etc. Then step 306 counts the number of submissions received from each group during a forms processing session. Then step 308 arranges the order of search of template groups in the most frequent to the least frequently processed groups.

Step 310 then starts a new forms processing session. Step 312 scans in a plurality of submitted forms in an aggregated submission. Step 314 starts the forms recognition process for the first form. Step 316 searches for the form template to match the first form, starting with the most frequently processed group. This group is initially stored in RAM memory 102.

Step 318 determines that if the recognition of the first form is successful with the most frequent first group, then the method starts the forms recognition process in the first group, for the next submitted form. Step 322 searches for a form template to match the next submitted form, starting with the related form templates in the first group. Then step 324 determines if the recognition of the next submitted form is successful with the form templates in the first group. If it is, then the method continues the forms recognition process in the first group, for the remaining plurality of submitted forms in the aggregated submission. The method then returns to the main program.

In step 326, the method determines if the recognition of the next submitted form was not successful in the first group. If it has not been successful, then the method searches for a form template in other groups having the same year. The method then returns to the main program.

Step 328 determines if the recognition of the first form was not successful when attempting to match with the most frequently used template group. If it was not successful, then the method accesses the second most frequently processed group from storage 414.

In FIG. 3B the method continues with step 330, which determines if recognition of the first form was successful with the second most frequently used template group. If it was successful, then the method starts the form recognition process in the second group, for the next submitted form. Step 334 searches for the form template to match the next submitted form, starting with the related form templates in the second group. Step 336 determines if recognition of the next submitted form was successful, using form templates in the second accessed group. If it was successful, then the method continues forms recognition processing for the remaining plurality of submitted forms in the aggregated submission. The method then returns to the main program.

The method then continues with step 338, which determines if recognition of the next submitted form was not successful in the second accessed group. If it was not successful, then the method searches for a form template in other groups having the same year. The method then returns to the main program.

The method then continues with step 340, which determines if recognition of the first form was not successful with the second most frequently used template group. If it was not successful, then the method accesses the third most frequently used primary form.

The method then continues in FIG. 3C, with step 342. In step 342, a determination is made if the recognition of the first form was successful with the third most frequently used template group. If it was successful, then the method starts forms recognition processing in the third group for the next submitted form. Step 346 searches for the form template to match the next submitted form, starting with related form templates in the third group. Step 34 then determines if recognition of the next submitted form was successful, with form templates in the third, accessed group. If it was successful, then the method continues forms recognition processing for the remaining plurality of submitted forms in the aggregated submission. The method then returns to the main program.

In step 350, if recognition of the next submitted form was not successful in the third, accessed group, then the method searches for a form template in other groups of the same year. The method then returns to the main program.

The method can continue with still additional groups for 405, if there are more than three template groups for this business application. There will be a corresponding number of template groups 416, for example, in the template storage 414. The method then returns to the main program.

The resulting invention manages forms recognition of preprinted form in an improved manner, to reduce the time required to find the correct forms recognition template in a template archive. The invention adaptively manages forms recognition of reprinted forms, to change the order of searching of the template archive, in response to the frequency with which particular form types are processed. It is within the scope of the invention, to have a manual override of the selected order of searching the template archive, if the system administrator so chooses.

Each template definition in the library of template definitions used to process scanned-in images of submitted forms, includes a 130 kilobyte portion which is the dropout profile for that form. The dropout profile is information used to assist in separating the informational content of a filled-out form from the background printed grid and printed characters on the form. Since there are a variety of forms which must be processed and for which the dropout operation performed, the amount of RAM storage required to store the template dropout profiles can become significant.

In the invention, the template dropout profiles are organized in small groups of, for example 50 profiles each. A determination is made as to the most frequently encountered forms to be processed. Typically, forms will be clustered in a business relationship, such as if a 1040 form has been recognized, the Schedule A, Schedule B forms are also likely to be associated in the same scanning session.

Another feature of the invention is the allocation of several partitions in the RAM memory to serve as queues for the purpose of accumulating scanned-in images of submitted forms which are partitioned by families. Each family of 50 form types will correspond to 50 different dropout profiles. In this feature of the invention, if a first queue for first family of form types has accumulated a sufficient number of scanned-in submitted forms, then the corresponding template dropout profiles are read into the RAM memory and that family of forms is processed in the dropout operation. In this manner, the dropout operation can concentrate on a particular family of form types and can use the corresponding group of template dropout profiles, before requiring the paging-in of a different group of dropout profiles. This reduces the latency time in reading-in template dropout profiles.

Another feature of the invention is when a new template is added to the library template storage 414. In order to add a new template, a comparison can be made between the form definition for the new template and the form definitions for all of the existing templates in the library. This can be done by progressing through the groups of form templates 416, 418 and 420, in the order established by the selector 404, based upon the frequency of occurrence for processing particular template groups 405. This will speed the identification of related templates so that a rapid determination can be made whether other, identical form templates exist in the template storage 414. To carry out this feature, the identity of the primary template associated with the particular new form definition entered into the system, should also be provided to the system. If an existing template is found in the template storage 414, then a more refined definition of the difference between its characteristic appearance and the characteristic appearance of the new template must be included in the template definition data, in order to provide a clear, distinctive forms recognition operation for the new template. After a check has been made through all of the existing form definition in the library, the new form definition template may be added to the template storage 414, in association with the group 416, for example.

The method of invention can be extended to consecutive levels of a hierarchical storage structure, wherein more than one class of characteristic features can be employed to identify the specific group of templates in the template storage 414. The hierarchical search technique would have the template group 405, access a pointer from the corresponding group 416, for example. The pointer would, in turn, point to a third tier group in the storage hierarchical, where the actual subsidiary template can be found.

The template storage process 412 referred to above can include a suitably configured index which relates group Ids, such as 416, to the location in the storage medium 414 of the subsidiary templates that belong to the group. In this way, templates in a group are not required to be stored in adjacent locations in storage medium 414.

Although a specific embodiment of the invention has been disclosed, it will be understood by those having skill in the art that changes can be made to that specific embodiment without departing from the spirit and the scope of the invention.

What is claimed is:

1. In a data processing system, a method of aggregated submitted forms recognition where an aggregated submission includes a plurality of mutually related forms included with each submission, comprising the steps of:

providing form templates for recognizing forms in the aggregated submission; grouping all form templates into groups of related form templates;

counting the number of times the first submitted form of each aggregated submission is matched to a particular group of related form templates during submitted forms processing;

arranging the order of search of groups of related form templates from groups most frequently having a match with the first submitted form of each aggregated submission to those least frequently having a match with the first submitted form of each aggregated submission;

scanning in a plurality of submitted forms in an aggregated submission;

starting a submitted forms recognition process for a first submitted form in the aggregated submission;

searching for a form template to match the first submitted form, starting with the group of related form templates most frequently having a match, and continuing the searching with the other groups of related form templates in the arranged order until a match between the first submitted form and a form template is found;

starting a submitted forms recognition process for a next submitted form in the aggregated submission, after a match has been found in one of said form template groups for the first submitted form; searching for a form template to match the next submitted form, starting with the group of related form templates where the previous match was found, if a match is not found in the group of related form templates where the previous match was found, the next group of related form templates in the arranged order is searched until a match is found; and continuing the submitted forms recognition process for the remaining submitted forms in the aggregated submission, as set forth in the previous step.

2. A data processing system to manage aggregated submitted forms recognition, where an aggregated submission includes a plurality of mutually related forms included in with each submission, comprising:

a template archive storage in said system, for storing document form templates in groups of related form templates;

processor means coupled to an input for receiving a plurality of aggregated submission document forms, for counting the number of times the first submitted form of each submission is matched to a particular group of form templates during forms processing;

said processor means coupled to said archive storage, for arranging the order of search of groups of related templates from groups most frequently having a match with the first submitted form of each aggregated submission to those least frequently having a match with the first submitted form of each aggregated submission;

scanning means coupled to said input, for scanning in a plurality of submitted forms in the aggregated submission;

said processor means searching for a form template to match the first submitted form, beginning with the group most frequently having a match and continuing to the next group most frequently having a match in the arranged order until a match between the first submitted form and a form template is found;

said processor means starting a forms recognition process for a next submitted form in the aggregate submission, if recognition of the first form is successful;

said processor means searching for a form template to match the next submitted form, starting with form templates in the group where the previous match was found and continuing with the next group of related form templates most frequently having a match from said template archive storage until a match between the next submitted form and a form template is found; and said processor means continuing the forms recognition process for the remaining submitted forms in the aggregated submission.

3. A data processing system to manage aggregated submitted forms recognition where an aggregated submission includes a plurality of mutually related submitted forms included with each submission, comprising:

a template archive storage in said system, for storing document form templates in groups of related form templates;

a first processor means coupled to an input for receiving submitted document forms, said processor means counting the number of times the first submitted form of each submission is matched to a particular group of form templates during forms processing;

said first processor means coupled to said archive storage, for arranging the order of search of groups of related templates from groups most frequently having a match with the first submitted form of each aggregated submission to those least frequently having a match with the first submitted form of each aggregated submission;

scanning means coupled to said input, for scanning in a plurality of submitted forms in the aggregated submission;

said first processor means searching for a form template to match the first submitted form, beginning with the group most frequently having a match;

said first processor means transferring the identity of said first submitted form to a second processing means in the system, when recognition of the first form is successful;

said second processor means searching for a form template to match the next submitted form, starting with form templates in the group having a match for said first submitted form and continuing with next group most frequently having a match until a match between the next submitted form and a form template is found; and said second processor means starting a forms recognition process for a next submitted form in the submission, if recognition of the previous form is successful with the group in which the previous match was found.

4. A data processing system to manage forms recognition, comprising:

a template archive storage in said system, for storing document form templates in groups of related form templates;

a document counting means coupled to an input for receiving submitted document forms, for counting the number of times the first form in plurality of aggregated submissions is matched for each group of related forms templates during forms processing;

a search ordering means coupled to said archive storage, for arranging the order of searching groups of related templates from most frequently having a match with the first form in a plurality of aggregated submissions to those least frequently having a match with the first form in a plurality of aggregated submissions;

a scanning means coupled to said counting means input, for scanning in a plurality of submitted forms in the aggregated submission;

forms recognition means coupled to said scanning means, for starting a forms recognition process for a first form in the submission;

searching means coupled to said search ordering means, for searching for a form template to match the first submitted form, starting with the group most frequently having a match with the first form in a plurality of aggregated submissions and continuing with the next group most frequently having a match in order until a match is found between the first submitted form and a form template;

said forms recognition means starting a forms recognition process for a next submitted form in the aggregate submission, if recognition of the first form is successful;

said searching means searching for a form template to match the next submitted form, starting with form templates in said group having the previous match; and said forms recognition means continuing the forms recognition process for the remaining submitted forms in the aggregated submission, if recognition of the next submitted form is successful.

5. In a data processing system, a method of aggregated submitted forms recognition where an aggregated submission includes a plurality of mutually related forms included with each submission, comprising the steps of:

a) providing form templates for recognizing forms in the aggregated submission;

b) grouping all form templates into groups of related form templates;

c) scanning in a plurality of submitted forms in an aggregated submission;

d) starting a submitted forms recognition process for a first submitted form in the aggregated submission;

e) searching for a form template to match the first submitted form in the groups of related forms by searching the groups of related forms in a predetermined order until a match between the first submitted form and a form template is found;

f) counting the number of times the first submitted form of each submission is matched to a particular group of related form templates during submitted forms processing;

g) starting a submitted forms recognition process for a next submitted form in the aggregated submission, after a match has been found in one of said form template groups for the first submitted form;

h) searching for a form template to match the next submitted form, starting with form templates in said group of related templates where the previous match was found, if a match is not found in said group of related templates where the previous match was found, the next group of related templates in the arranged order is searched until a match is found;

i) continuing the submitted forms recognition process for remaining submitted forms in the aggregated submission, as set forth in the previous step;

j) periodically arranging the order of search of form template groups from most frequently having a match with the first submitted form of each aggregated submission to those least frequently having a match with the first submitted form of each aggregated submission to create a new predetermined order; and k) repeating steps c through j.

* * * * *